UNITED STATES PATENT OFFICE.

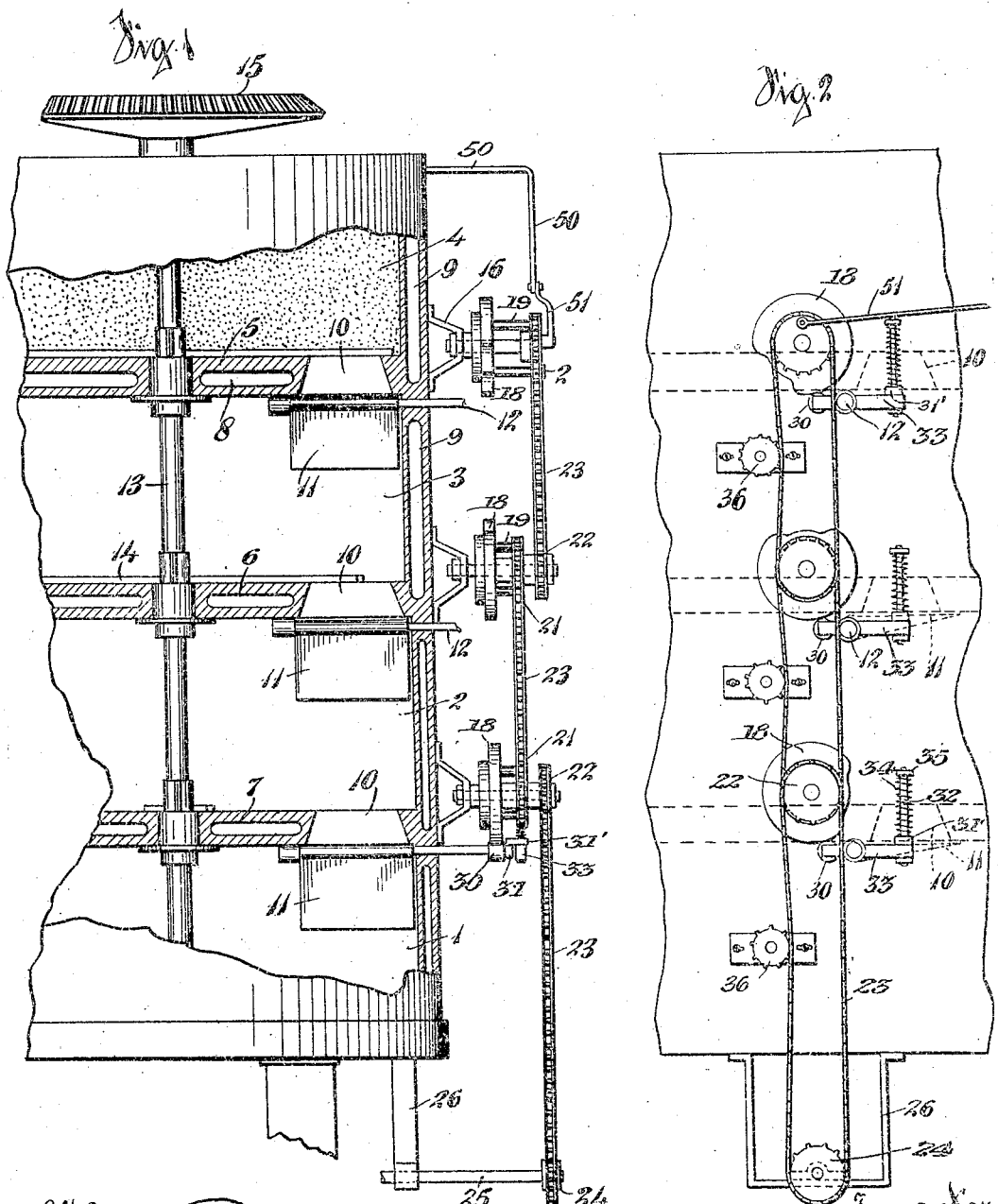

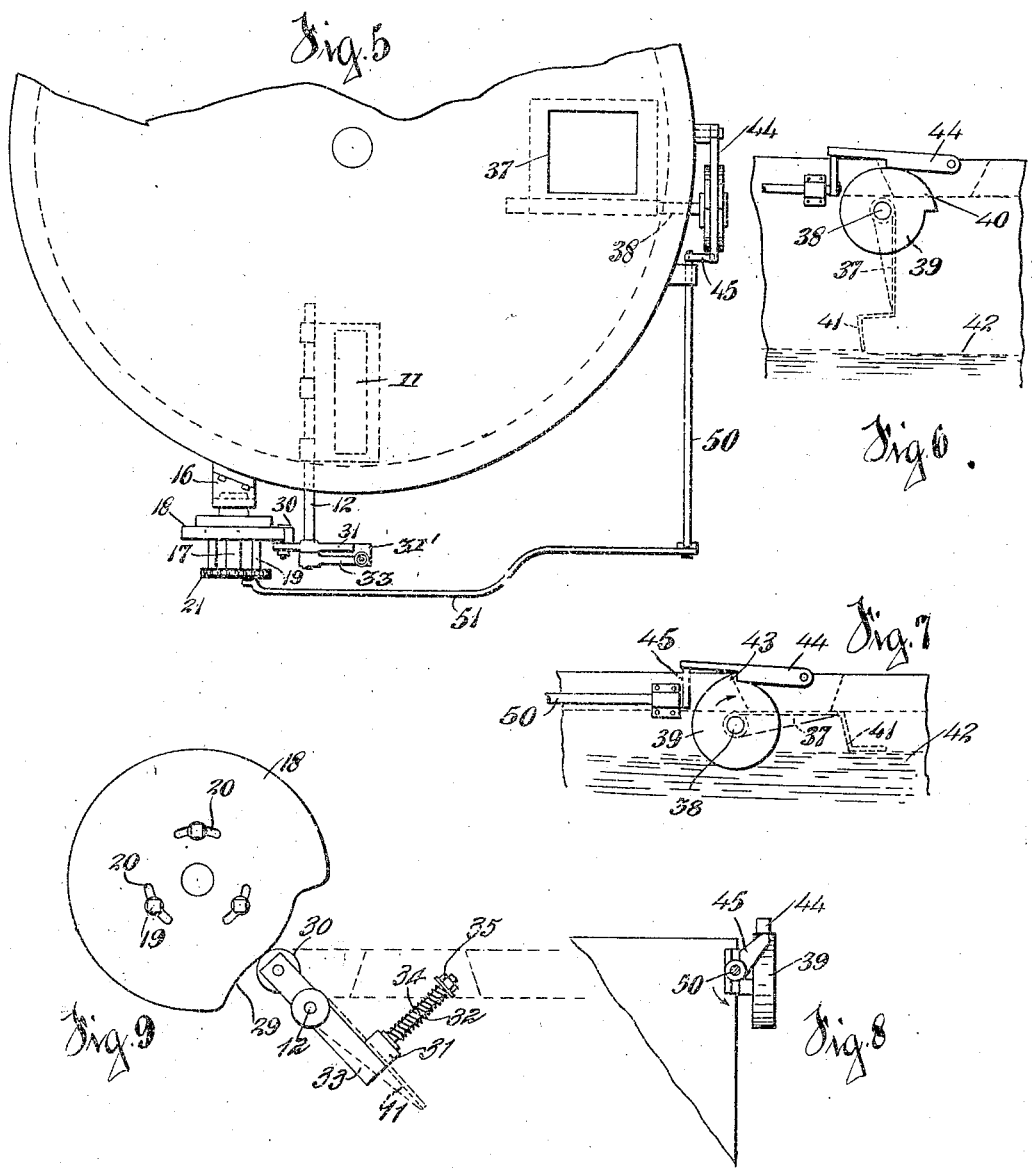

ALBERT BLANCHARD CARR, OF ATLANTA, GEORGIA, ASSIGNOR TO THE PROCTER AND GAMBLE COMPANY, OF CINCINNATI, OHIO, A CORPORATION OF OHIO.

STEAM-COOKER FOR OIL-BEARING MEAL.

1,082,303.

Specification of Letters Patent.

Patented [REISSUED] 1913.

Application filed March 2, 1913. Serial No. 782,357.

*To all whom it may concern:*

Be it known that I, ALBERT BLANCHARD CARR, a citizen of the United States, and a resident of the city of Atlanta, in the county of Fulton and State of Georgia, have invented certain new and useful Improvements in Steam-Cookers for Oil-Bearing Meal, of which the following is a full, clear, and exact description, reference being had to the accompanying drawings, forming part of this specification.

My invention relates to improvements in steam cookers of the kind used in oil mills for cooking meats preparatory to expressing the oil therefrom, and more particularly to cookers as used in cooking cottonseed meats. Under the usual construction for steam cookers of this kind, the kettles are arranged in a descending or vertical series, one over the other, each kettle, except the last one, having a bottom with discharge opening therein arranged to discharge the meats into the kettle next below it, and with doors for these openings arranged either to be opened and closed by hand, or to be opened and closed automatically by the height of the meal in the cooker below the door. In the constructions of cookers in which the doors are arranged to open and close automatically by the height of the meal, when the meal is removed from the lowest kettle, all of the doors will open in turn, and as a result it frequently happens that a considerable portion of the meats delivered into the uppermost kettle would find their way through the series without being cooked the proper length of time. It is very important for the proper treatment of the meal that the material should be cooked a definite length of time, and that all of the meal shall be uniformly cooked.

It is the object of my invention to provide a construction for opening and closing the discharge passageways from the kettles so as to insure regularity in the time of cooking, and to provide for complete uniformity, so that no raw meal can become mixed with either cooked or partially cooked meal.

My invention consists of that novel construction and arrangement of parts to be hereinafter particularly pointed out and claimed, in which the closing and opening of the doors in the kettles shall be automatically controlled by a time-movement of the door operating devices to insure the retention in each kettle of all of the meal deposited therein for a definite length of time, and to prevent the possibility of uncooked meal passing through the series of kettles.

Figure 3:
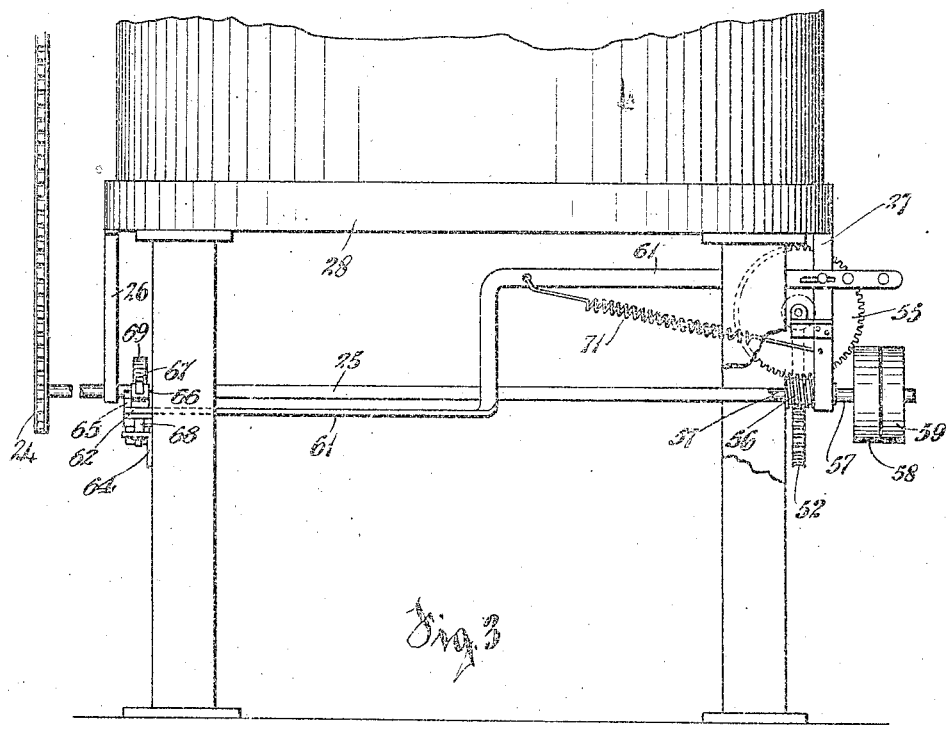
Figure 4:
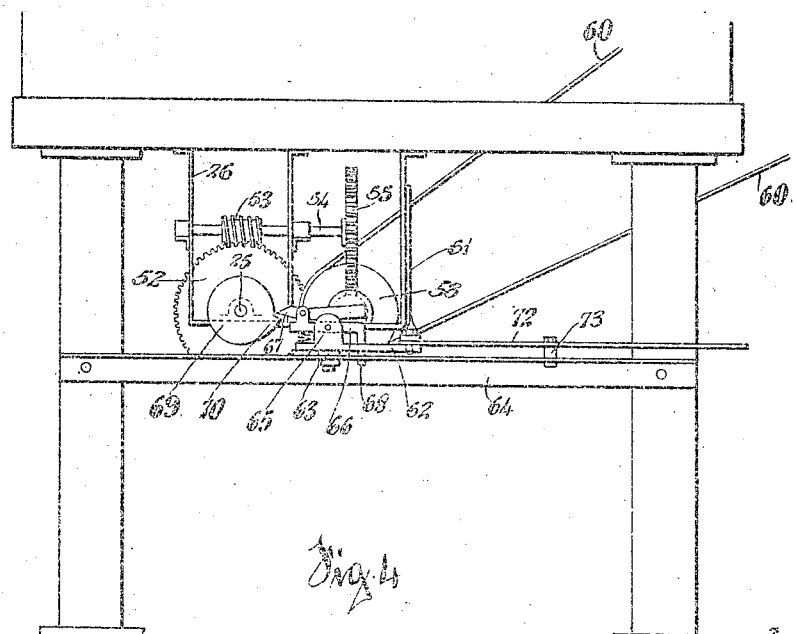

In the drawings, Figure 1 is a side elevation, partly in vertical section, of a series of cooking kettles with my invention applied thereto, the starting and stopping devices at a lower portion being omitted. Fig. 2 is a front elevation of the same. Fig. 3 is a side elevation of the lower portion of the cookers illustrating the starting and stopping devices. Fig. 4 is a front elevation of the same, taken from the left hand side of the construction shown in Fig. 3, and with the sprocket wheel and chain removed. Fig. 5 is a plan view of a portion of the uppermost kettle illustrating the controlling mechanism for delivering the meal to the uppermost kettle from the conveyer. Fig. 6 is a detail, in front elevation, of the locking device for the delivery door for the top kettle, with the door released. Fig. 7 is a similar view, with the door closed. Fig. 8 is an end view of the same. Fig. 9 is an enlarged view of one of the controlling cams.

As illustrated in the drawings, I have shown a series of four kettles 1, 2, 3, 4, one on top of the other, with the bottom plates 5, 6, and 7 of the intermediate kettles forming the top plates or covers of the kettles next below. These kettles are provided with spaces 8 in the bottom plates, and spaces 9 in the side walls for the introduction of steam for cooking the meal. Each kettle is provided with an opening 10 in the bottom plate, for delivering the contents of an upper kettle directly into the kettle next below. Each of these openings 10 is closed by a door 11, which is fixedly mounted on a rod 12, which extends out through the wall of the kettle. A central shaft 13 extends vertically through the series of kettles, and the shaft is provided with stirrer arms 14 for stirring the contents, and the shaft is driven by the gear 15 by suitable power.

Immediately above the point of projection of each rod 12 to which the respective doors are secured, is mounted a bracket support 16, one for each rod, and in each of these brackets a shaft 17 is mounted, carrying secured thereon a cam 18, and secured to the face of each cam by bolts 19, mounted for proper adjustment in slots 20 in the cams, is a sprocket wheel 21. The cams below the uppermost cam are each provided with a second sprocket wheel 22, and sprocket chains 23 extend between these sprocket wheels, so that they may all be driven at a uniform speed from the sprocket 24 on the counter shaft 25, suitably mounted in brackets 26, 27, depending from the platform 28 which supports the kettles.
The cams 18 are disks with a proper portion cut away on the periphery at 29, and upon the periphery of each of these cams rides a roller 30, mounted on the short arm of a lever 31, each loosely mounted on its respective rod 12, on which the door for the kettle is secured. The opposite end of each of these levers 31 has a right angle projection 31' which extends out over the lever 33 which is tightly secured on the outer end of the rod 12. This lever 33 carries a rod 32, which passes through the extension 31' while a coiled spring 34 bears between the extension 31' of the lever 31 and the adjusting nut 35 on the screw threaded, outer end of each rod 32. This construction is provided, as will be readily understood, to serve as a buffer spring construction in closing the doors. When the rollers 30 are each riding on the peripheries of their respective cam disks 18, the doors 11 will be closed; but as the rollers ride down the cam surfaces 29 with the rotation of the cam disks, the doors will drop open by gravity and by the pressure of the meal in the kettle above.

It will be evident from the foregoing construction that when the cam disks are properly adjusted and rotated at the required rate of speed, the doors of the kettles will be kept closed for the major portion of the time of rotation of the cams, and will be allowed to open during a much smaller interval of time. As will be hereinafter indicated, the cams are rotated at a speed to make a complete rotation in about eighteen minutes, but of course this speed may be varied as desired. For three-fourths of the time, the doors of the kettles will be closed, and for about one-fourth of the time they will be allowed to open.

In order to keep proper tension on the sprocket chains, idler sprockets 36 are provided, arranged to be adjusted toward the chains. The cams are so arranged and adjusted with reference to the contact with the door levers, that only one of the doors will be open at a time, and so that the doors in the kettles may be opened in sequence.

Extending across the top of the uppermost kettle, although not illustrated in the drawings, is a conveyer for conveying the meal to the kettles. In order that the delivery of meal shall be stopped when the uppermost kettle is filled, and until it is desired to supply further meal to the series, a door 37 for the conveyer trough, or for the cover over the uppermost kettle is provided. This door is mounted on a spindle 38 (Figs. 5 to 8), which on its outer end carries a disk 39, provided with a cam surface 40. The door 37 is provided with an angular arm 41 which extends into the uppermost kettle so as to rest on the meal indicated, in Figs. 6 and 7, at 42. The door 37 is closed by the raising of the arm 41 as the meal fills into the uppermost kettle, and when the door 37 is closed, the shoulder 43 on the cam disk 39 engages behind the catch 44, pivoted on the framework, and this door is held locked by this catch until positively released by the raising of the catch 44 under the impulse of the arm 46 on the rock shaft 50, which is connected by a connecting rod 51 with the uppermost sprocket, which controls the opening of the door in the bottom of the uppermost kettle. While the door which controls the feed from the conveyer is thus closed by the filling of the meal in the uppermost kettle, the opening of this feed conveyer door is regulated and controlled by the movement of the sprockets under which the doors in the bottoms of the kettles are open. With each rotation of the sprockets and cam disks controlling the doors, the mechanism is stopped, to be started again by the operator when he has removed the contents of the bottom kettle for deposit in the former which forms the cakes for the presses. It will be understood that a door is provided in the bottom of the lowest kettle for the removal of the contents of each kettle. This door, however, is not time-controlled.

To arrange for the proper time movement of the apparatus and for starting and stopping the same, I provide as follows: 25 is the counter shaft upon which the lowermost sprocket 24 is mounted. On the opposite end of this counter shaft (Fig. 3), the gear 52 is secured which meshes with the worm 53. The worm shaft 54 is also provided with a worm wheel 55, which engages with the worm 56 on the driving shaft 57 which is suitably mounted at one side of the apparatus. This driving shaft carries a tight pulley 58 and a loose pulley 59, with belt 60 for driving the driving shaft. A belt shifter 61 engages this belt, the shifter bar being guided by a slot and pin on the hanger
27. This shifter bar extends across the machine and is secured at its outer end to the lever 62, which lever 62 is pivotally mounted at 63 on the vertical stud secured to the angle bar 64. The lever is provided with upstanding lugs 65, in which is pivotally mounted the latch 66, upon which latch is mounted at one end the dog 67, and at the other end the latch 66 is turned down to form a locking pin 68, which in normal position takes into an opening in the angle bar 64 to lock the lever, and with it the belt shifting bar to the angle bar. Mounted on the counter shaft 25 is the cam disk 69, provided with a shoulder 70, and as the cam disk is rotated with the counter shaft, at the end of each rotation, the cam will depress the dog 67 and raise the latch 66 to release the lever 62 and with it the belt shifter, which thereupon will be thrown to the right as viewed in Fig. 3, by a spring 71, so that the belt 60 will be thrown from the tight to the loose pulley 59. Thus with every revolution of the counter shaft and the opening and closing of all of the doors in the bottoms of the kettles, the timing mechanism will be thrown out of operation. Attached to the outer end of the belt shifting bar is a hand lever 72, pivoted at 73 to the angle bar 64, and with this hand lever the operator starts the mechanism by shifting the belt to the tight pulley.

The operation of my improvements will be evident from the foregoing description. Let us assume that all of the kettles are empty; the apparatus is started and the cams rotated until the door 37 in the bottom of the conveyer is open, and the door in the bottom of the first kettle closed. The meal is then fed from the conveyer into the first kettle and this continues until the door in the conveyer closes by reason of the material filling up the first kettle. The steam having been turned on in the steam jackets surrounding the kettles, at the end of the required time, the door in the bottom of the upper kettle opens, transfers the meal to the kettle below it, and the door closes, and the fresh meal is deposited in the upper kettle and the meal is kept for a definite length of time in each kettle. When the kettles are all filled, and the mechanism is stopped with the rotation of the cam disk 69, the operator opens the door in the bottom kettle, and the material is removed to the former. As soon as the meal has been removed from the bottom kettle, the door is closed and the cycle of operations again is started, the bottom kettle being filled from the one next above it in which the material has been subjected to the steaming process for three-fourths of the required time. In this way, all the meal in each kettle must be uniformly steamed and cooked, and all the meal as it is taken from the bottom kettle has been subjected to the cooking operation for the required length of time. There is no chance whatever for the uncooked or partially cooked meal to pass through the kettles. The doors are not open all at the same time, but in succession, and the meal from one kettle can pass only to the kettle next below it.

Having thus described my invention, what I claim as new and desire to secure by Letters Patent, is:—

1. In an apparatus of the character specified, a series of kettles arranged one above the other, with discharge openings from one kettle to the kettle next below and doors for the openings, with means for mechanically opening and closing each door in succession in timed relation to each other.

2. In an apparatus of the character specified, a series of kettles arranged one above the other, with discharge openings from one kettle to the kettle next below and doors for the openings, with cams for opening and closing the doors, and means for actuating the cams in timed relation to open and close each door in succession.

3. In an apparatus of the character specified, a series of kettles arranged one above the other, with discharge openings from one kettle to the kettle next below and doors for the openings, with cams for opening and closing the doors, sprocket wheels and chains for driving the cams, with power connection for the driving sprocket and means for disconnecting the power with each rotation of the cams.

4. In an apparatus of the character specified, a series of kettles arranged one above the other, with discharge openings from one kettle to the kettle next below and doors for the openings, with means for mechanically opening and closing each door in succession in timed relation to each other, and mechanism for disconnecting the door actuating means at the termination of each cycle of operations.

5. In an apparatus of the character specified, a series of kettles arranged one above the other, with discharge openings from one kettle to the kettle next below and doors for the openings, with means for mechanically opening and closing each door in succession in timed relation to each other, a supply opening for delivering meal to the uppermost kettle, with door therefor, means for closing said door by contact with the meal in the uppermost kettle, catch to lock said door, and connecting mechanism intermediate the catch and the door opening and closing means for the kettles whereby said supply door shall be released in timed relation to the operation of the kettle doors.

6. In an apparatus of the character specified, a series of kettles arranged one above the other, with discharge openings from one kettle to the kettle next below and doors for the openings, with cams for opening and closing the doors, and means for actuating the cams in timed relation to open and close each door in succession, a supply opening for delivering meal to the uppermost kettle, with door therefor, means for closing said door by contact with the meal in the uppermost kettle, catch to lock said door and connecting mechanism intermediate the catch and the cam for the door of the uppermost kettle whereby said catch shall be released in timed relation to the opening of said door.

7. In an apparatus of the character specified, a series of kettles arranged one above the other, with discharge openings from one kettle to the kettle next below and doors for the openings, with cams for opening and closing the doors, and means for actuating the cams in timed relation to open and close each door in succession, a supply opening for delivering meal to the uppermost kettle, with door therefor, means for closing said door by contact with the meal in the uppermost kettle, catch to lock said door and connecting mechanism intermediate the catch and the cam for the door of the uppermost kettle whereby said catch shall be released in timed relation to the opening of said door, and mechanism for disconnecting the door actuating means at the termination of each cycle of operations.

8. In an apparatus of the character specified, a series of kettles arranged one above the other, with discharge openings from one kettle to the kettle next below and doors for the openings, with cams for opening and closing the doors, sprocket wheels and chains for driving the cams, a driving shaft with tight and loose pulleys thereon, a spring-actuated belt shifter, with lock therefor, and cam connected with one of the sprocket wheels to release said lock with each rotation of the sprocket to permit the operation of the belt shifter to disconnect the power.

ALBERT BLANCHARD CARR.

Attest:
E. C. AINSLIE,
R. S. PATTULLO.